April 29, 1947. G. A. MATTHEWS Re. 22,872

APPARATUS FOR PROTECTING POWER LINES

Original Filed May 7, 1940 4 Sheets-Sheet 1

Inventor:

George A. Matthews,

By Potter, Pierce & Scheffler,

Attorneys.

April 29, 1947. G. A. MATTHEWS Re. 22,872

APPARATUS FOR PROTECTING POWER LINES

Original Filed May 7, 1940 4 Sheets-Sheet 2

Inventor:

George A. Matthews,

By Potter, Prince & Schaffler,

Attorneys

April 29, 1947. G. A. MATTHEWS Re. 22,872

APPARATUS FOR PROTECTING POWER LINES

Original Filed May 7, 1940 4 Sheets-Sheet 3

Inventor:

George A. Matthews,

By Potter, Pierce & Scheffler,

Attorneys.

April 29, 1947. G. A. MATTHEWS Re. 22,872
APPARATUS FOR PROTECTING POWER LINES
Original Filed May 7, 1940 4 Sheets-Sheet 4
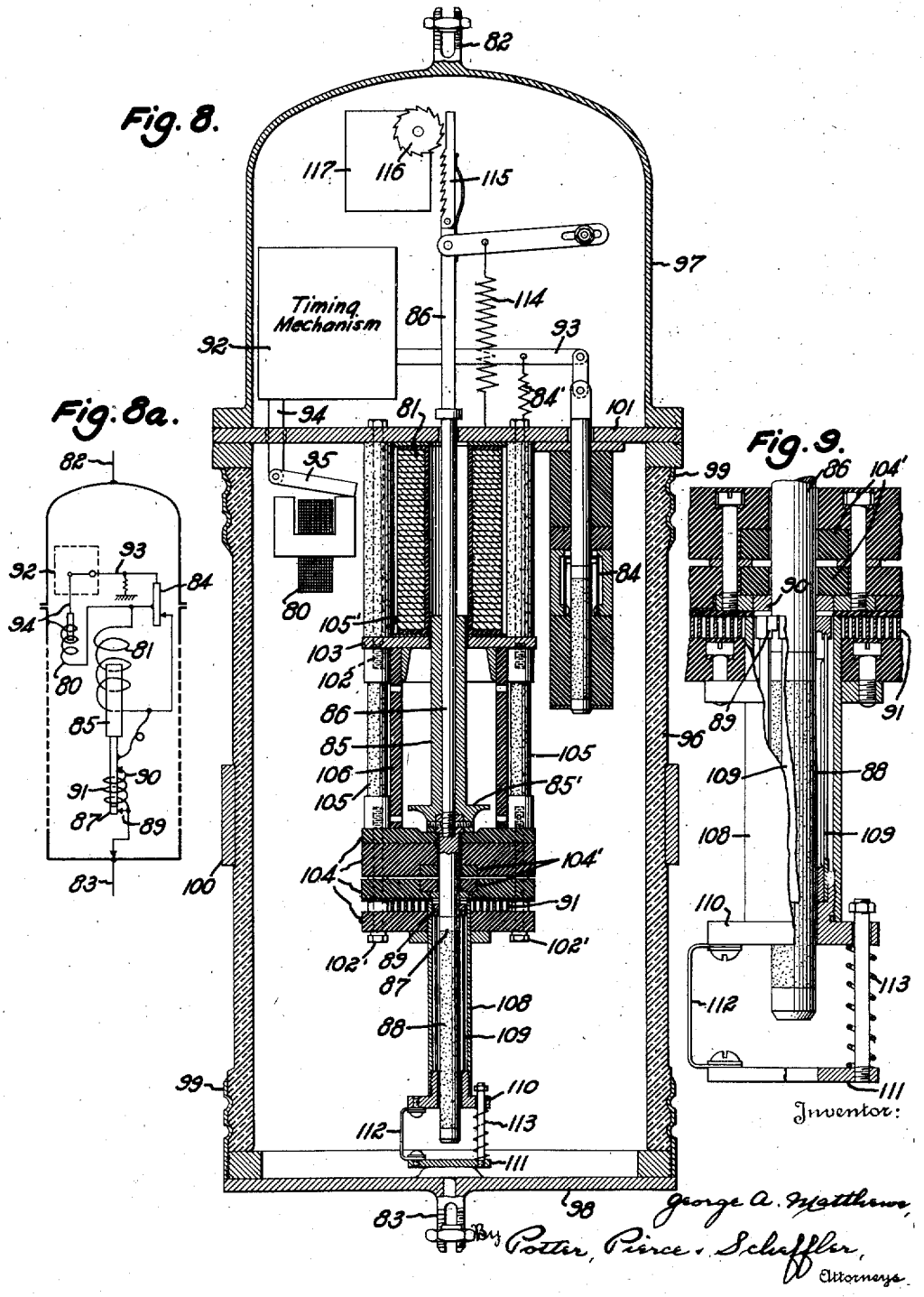
Inventor:
George A. Matthews,
By Potter, Pierce & Scheffler,
Attorneys.

Reissued Apr. 29, 1947 Re. 22,872

UNITED STATES PATENT OFFICE 22,872

APPARATUS FOR PROTECTING POWER LINES

George A. Matthews, Detroit, Mich., assignor to The Detroit Edison Company, Detroit, Mich., a corporation of New York Original No. 2,352,556, dated June 27, 1944, Serial No. 333,875, May 7, 1940. Application for reissue August 20, 1945, Serial No. 611,617

15 Claims. (Cl. 175—294)

This invention relates to apparatus for protecting electrical power lines against damage from short circuits and/or arcing faults between the line conductors. The invention is not limited to, but is particularly useful in connection with, overhead feeder circuits of the insulated conductor type.

Studies of the records of interruptions to overhead circuits show that over 85% resulted from purely transient faults due to such causes as lightning flashover, line conductors momentarily swinging together, and small conductors or other foreign objects falling across the wires; and only a small percentage of circuit interruptions are due to permanent faults. Unfortunately, however, the power arc that starts from a transient fault under the present systems of feeder circuit protection frequently results in a burn off of the line conductor, or at least in damage that so weakens the conductor as to give rise to mechanical breakage by wind, sleet or snow loadings.

The equipment generally employed by practically all utility companies for the protection of feeder circuits includes time-delay overcurrent relays for tripping the station breaker, and reclosing equipment for obtaining one or more timed reclosures up to a lockout in the case of a permanent fault. The tripping of the station circuit breaker has been purposely delayed to provide a time differential between the operation of a protective device, such as the fuse at a distribution transformer or an overload breaker on a customer's premises, as it has been the generally accepted plan to avoid an opening of the main feeder circuit by faults which, in theory, could be removed by local protective devices. The operating characteristics of such equipment, in the typical case of a city circuit with a relay set to trip at 500 amperes, have been a delay of several seconds at overloads of from 500 to 750 amperes, with a progressive decrease in the tripping time to about 30 cycles, on a 60 cycles per second alternating current distribution circuit, at 2000 amperes. The delay in tripping remains approximately constant at higher fault currents, and the total circuit clearing time for fault currents of 2000 amperes or over has been about 41 cycles, i. e., the relay tripping time plus about 11 cycles for opening the breaker contacts and extinguishing the arc drawn between them. The equipment on rural circuits has been, in general, adjusted for a longer delay than that for city feeder circuits.

Protective equipment of this type was generally satisfactory several years ago, but the conditions for which it was designed have altered materially as increasing loads have resulted in the use of substation transformers of larger size and higher short circuit current capacity, and the bare conductors originally installed on suburban and rural lines have been replaced by insulated or "weatherproofed" copper wire to meet local ordinances. An increase in the short circuit current in a fault obviously increases the rate at which an arcing fault damages the conductors and, for any given fault current, insulated conductors are badly burned or melted off before the station breaker opens as the insulation holds an arcing fault at the location where it was initiated. With bare wires, the arc traveled freely along the line until it was blown out or reached insulators where it was usually stopped. Damage to the tie wires or to the insulators might then occur but, in general, there is less likelihood of damage to bare wires than to insulated wires in the case of transient faults.

Heavier short circuit currents and insulated conductors have thus created such conditions that even a transient fault generally results in a burn off of the conductors of the affected branch feeder circuit and frequently results in a loss of service on the entire main feeder circuits. It has been proposed to set the relays for "instantaneous tripping" of the station breakers, and to design the breakers for more rapid operation. Faster operation is obviously essential if burn off of the insulated conductors is to be avoided but the switchgear now commercially available cannot open a faulty 60 cycles line in less than about 10 cycles, and the best performance claimed for any experimental equipment has been 5 cycles between the initiation of the fault and the opening of the line.

I have made a systematic study of the burn off characteristics of the weatherproofed copper wire now in general use, i. e., in sizes from No. 6 solid up to No. 4/0 stranded, and have found that it is not possible to effect a substantial decrease in circuit outage from transient faults by reducing the total clearing time from 10 cycles to 5 cycles. The fact is that the short circuit current flow in an arcing fault between the insulated conductors of existing overhead distribution circuits is of such magnitude, with respect to the wire size, that serious damage or a complete burn off results if the arcing fault continues beyond from ½ to 2 cycles on a 60 cycles line.

The design difficulties encountered in reducing the clearing time of prior circuit breakers from 11 cycles to 8 cycles indicate that there is but little possibility of decreasing the operating time to less than about 5 cycles with the prior protective methods and circuit arrangements. The problem of constructing switchgear for the removal of an arcing fault from a high voltage line in from ½ cycle to 2 cycles can be solved however by placing on the feeder circuit an additional element which functions to reduce the line voltage at the fault to zero or substantially zero in from ½ to 2 cycles, depending upon the magnitude of the fault current, after the initiation of the fault. An interruption of current flow at the fault within from ½ to 2 cycles will be referred to hereinafter as an "instantaneous removal" of the fault current, and this term is to be distinguished from the term "instantaneous tripping," which signifies nothing more than the adjustment of the tripping relay to energize the circuit breaker "opening" coil in as short a time as is possible. The new element for use with existing switchgear or with the faster switchgear contemplated by this invention will be termed a "line shorting contactor" or "shorting contactor" as its function is to short circuit the lines affected by a fault, thereby establishing a low resistance short circuit that develops the full short circuit current capacity of the transformer feeding the distribution circuit. This heavy flow of current simplifies the circuit breaker design by insuring adequate power for the rapid operation of the breaker even in the case of a fault at a remote point on a long line. The instantaneous suppression of the initial fault current substantially eliminates burn off from transient faults but does not solve the problems of protecting the overhead lines and associated station equipment, and of maintaining service on other portions of the feeder circuit in the case of a permanent fault on a branch line. The line shorting contactor supplements, but does not replace, other equipment such as circuit breakers, or other timing devices that reclose the circuit a plurality of times and for periods of upward of 30 cycles in attempts to burn off the fault or the faulty branch circuit in the case of a permanent fault.

Objects of the invention are to provide novel apparatus for the instantaneous removal of arcing faults from power distribution lines. Further objects are to provide apparatus for the instantaneous removal of the line voltage at a faulty section by first short circuiting and then opening the line, and for the subsequent reclosure of the line for relatively long periods and at timed intervals, up to a lockout in the case of a permanent fault. Objects are to provide line protecting switching equipment of high current capacity and characterized by operating times far shorter than has been heretofore attainable. An object is to provide line protective equipment including switching mechanism for extinguishing an arcing flashover on a 60 cycles line within substantially ½ cycle after the fault inception, additional switch mechanism for successively energizing the line to send current through the fault if it remains on the line, and for opening the line permanently in the case of a permanent fault.

These and other objects and advantages of the invention will be apparent from the following specification when taken with the accompanying drawings in which:

Fig. 8 is a central section of a circuit breaker having the rapid operating characteristic of curve B of Fig. 1;

Fig. 8a is a schematic diagram of the same; and

Fig. 9 is an enlarged fragmentary view of the breaker contacts.

Figure 1:
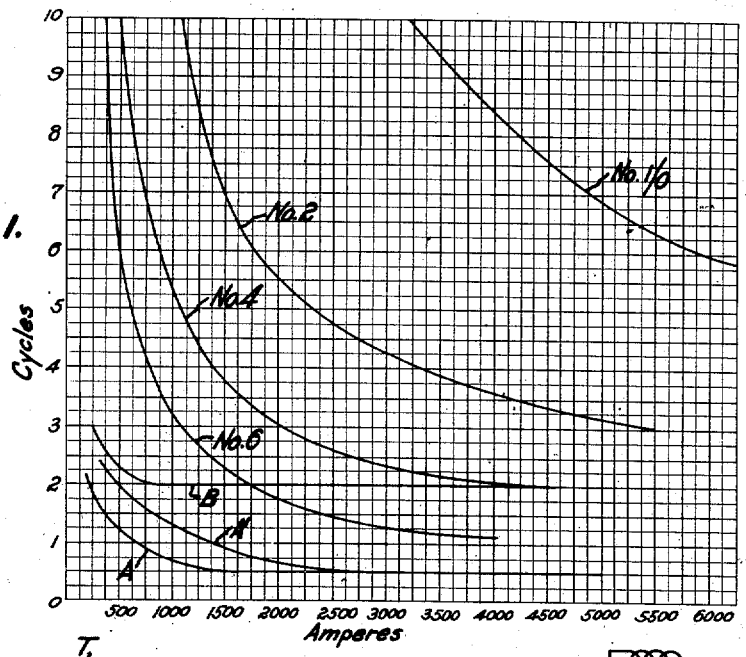
Fig. 1 is a curve sheet showing the relation between the magnitude of a fault current and, respectively, the time required to burn off insulated conductors of different sizes and the operating times of certain apparatus of this invention.

The novel features of the invention may be best understood by first considering curves "No. 6" to "No. 1/0" of Fig. 1, that show the time, in cycles on a 60 cycles basis, in which arcing fault currents of different magnitudes burn off weatherproofed copper wires of the sizes indicated by the legends identifying the curves. The conductors were tested under conditions of horizontal spacing and tension that simulated service conditions on a 5000 volt feeder circuit, and the arcs were initiated by drawing a No. 40 copper wire across bared sections of the conductors. The time values were obtained from an oscillograph and represent the actual parting of the conductors, i. e., they do not include the time of arcing between the conductors as they fell away after parting.

The smallest size, No. 6 W. P. copper wire, is used on many long branch feeder circuits where the normal load may be up to about 20 amperes and the substation transformers have a short circuit current output of upward of 1500 amperes. Curve No. 6 shows that this small conductor will burn off in 2 cycles or 1/30 second under an arcing fault of about 1700 amperes, while curve No. 4 shows that the arcing fault current must be about 4500 amperes to burn off a No. 4 insulated copper wire in 2 cycles, and curve No. 2 shows that wire of this size will be burned off in 3 cycles by an arcing fault of 5500 amperes, or in 7 cycles by an arcing fault of 1500 amperes.

The significance of this family of curves is that arcing faults of the magnitudes encountered on various feeder circuits of different wire sizes will burn off the conductors in the 8 or 10 cycle interval between the fault initiation and the opening of the fastest switching gear of the present commercial installations. Furthermore, a reduction of the breaker opening time to 5 cycles will not effect an appreciable reduction in the burn off or damage from arcing faults, and the present experimental attempts to obtain 5 cycle operation of a circuit breaker therefore will not eliminate the burn off of insulated conductors by arcing flashovers due to purely transient faults.

Figure 2:
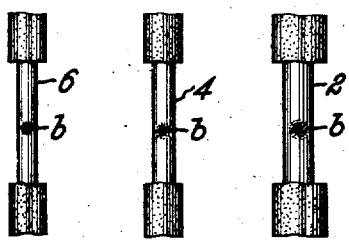
Fig. 2 is a fragmentary elevation of insulated conductors of different sizes showing limited damage caused by arcing faults that are suppressed in less than 1/30 second.

Some damage results from any arcing fault but the factor of safety normally provided in good circuit design permits some reduction in the cross-section of the conductor without introducing a serious hazard of mechanical weakness. Tests on many arc-burned copper wires of several sizes indicate that, in general, the damage is not likely to result in breakage of wire by high wind or sleet loadings when the burn reduces the original cross-section by not more than about 25%. The limited damage resulting from arcing faults that are removed "instantaneously," in accordance with this invention, is indicated by Fig. 2 in which insulated copper wires of sizes No. 2, No. 4 and No. 6 are identified by reference numerals 2, 4 and 6, respectively. The line voltage was 5000 volts and the arcing fault current was 1500 amperes in the series of tests in which the specimens of Fig. 2 were obtained. The arcing fault on the smallest wire 6 was removed in ½ cycle, and the arcing faults on wires 2 and 4 were removed in 2 cycles. The illustrated arc burns *b* of the several conductors are typical of the results obtained during a systemmatic study of arcing damage to line conductors, and mechanical tests of similar specimens showed that burns of this order do not reduce the tensile strength of the wires below safe working values.

Reverting to Fig. 1, the curves A, A′ show the relation between fault current and the operating time of line shorting contactors, to be described later, of normal current ratings of 100 and 200 amperes, respectively, and curve B shows the opening time of a novel circuit breaker contemplated by this invention. Overload currents of the order of 1500 and 2500 amperes will actuate the line shorting contactor to closed position, thereby collapsing the line voltage at the fault to zero, within substantially ½ cycle after the fault initiation. Curve B shows that the new circuit breaker will open in 2 cycles at any fault current above about 700 amperes. These operating speeds are substantially higher than any previously attained on feeder circuits with switchgear that is electrically and mechanically stable, and these high operating speeds for the instantaneous suppression of the fault current, by collapsing the line voltage and/or opening the line, eliminate the burn off of line conductors by transient faults.

Figure 3:
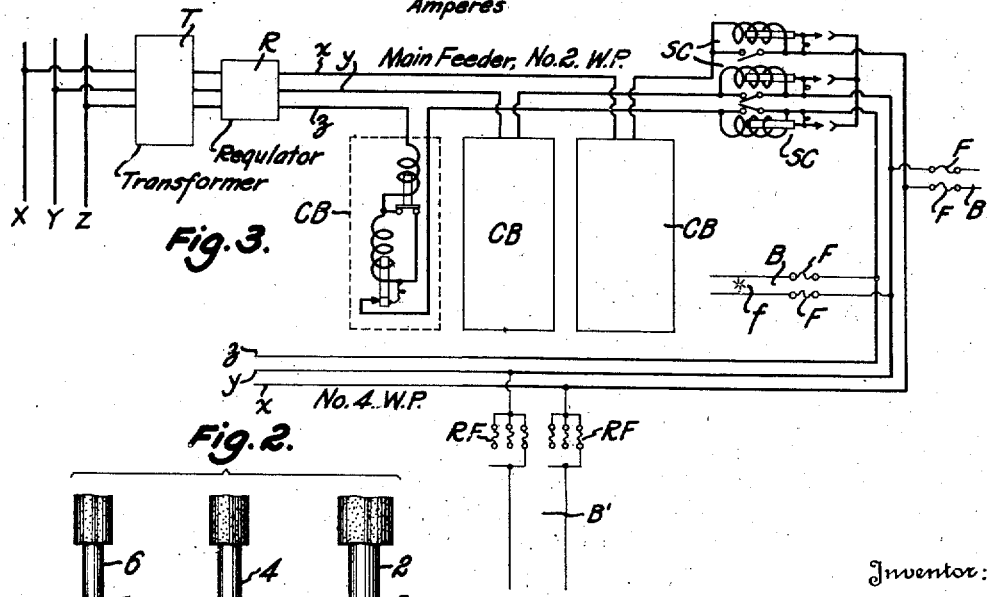
Fig. 3 is a fragmentary circuit diagram of an electrical distribution system including protective equipment embodying the present invention.

A typical embodiment of the invention is shown in the Fig. 3 circuit diagram of a substation and 5000 volt, 60 cycles feeder circuit working out of a high voltage line X, Y, Z. The transformer T and regulator R are or may be of conventional design. Reclosing circuit breakers CB are placed on the several main feeder conductors *x*, *y*, *z*, at the substation and may be of conventional design but preferably, as shown, are of a new instantaneously operating design and consist in fully automatic single pole circuit breakers that are self-contained and self-actuated. A line shorting contactor SC is also placed on each conductor of the main feeder circuit, preferably at some distance from the substation to cushion the shock to be placed upon the station equipment by the metallic short circuit that is placed upon the line when the shorting contactors are tripped by a fault current.

The main feeder wires leaving the substation may be No. 2 weatherproof copper conductors and may be continued by No. 4 weatherproofed, as indicated by the legends, at a distance from the substation where the load has been reduced by various branch circuits B that are connected to the main feeder circuit. The branch circuits may be of No. 6 copper wire, either bare or insulated depending upon local ordinances, and each branch is preferably protected by fuses F. In the case of an important feeder branch B′, the branch is preferably protected by repeater fuses RF.

Figure 4:
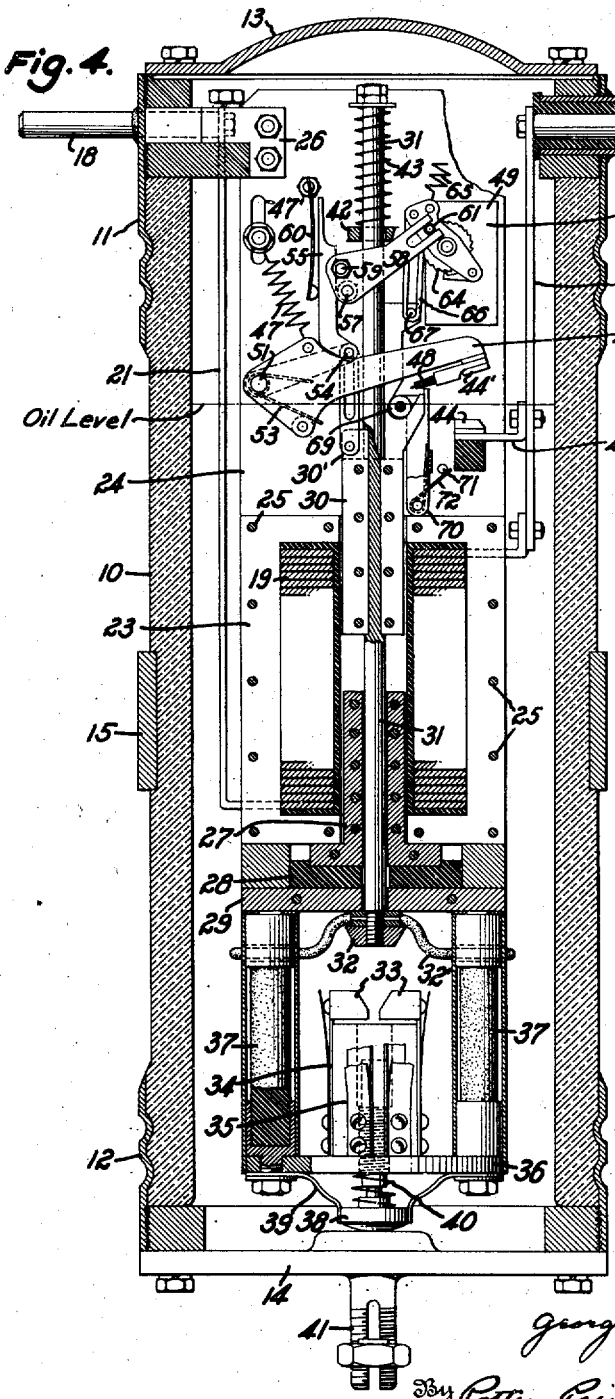
Fig. 4 is a central section through a line shorting contactor.
Figure 4A:
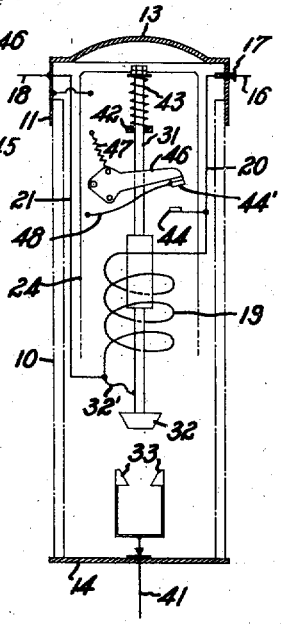
Fig. 4a is a schematic diagram of the same.

The physical structure of a line shorting contactor SC is shown in Fig. 4, and the elements and circuit connections are shown schematically in Fig. 4*a*. Each shorting contactor is a fully automatic, self-contained unit housed within a chamber comprising a hollow insulator 10 with upper and lower metal sleeves 11, 12, and top and bottom closures 13, 14 that are bolted to the sleeves 11, 12, respectively. The central portion of the insulator 10 is grooved or otherwise shaped to receive a supporting bracket 15 by which the shorting contactor is mounted on a pole or framework within a substation. A source or line terminal 16 enters the upper shell 11 through an insulating bushing 17, and a load terminal 18 extends through and is welded or otherwise mechanically and electrically connected to the shell 11. The operating coil 19 of the contactor is connected between the terminals 16, 18 by straps 20, 21, respectively, the coil 19 comprising a single or multiple layer solenoid wound from a flat copper bar. The coil 19 is mounted within a laminated core 23 that is secured between a pair of supporting plates 24 by bolts 25, and the plates 24 are secured to and grounded on the upper metallic shell 11 by brackets 26. The central section 27 of the laminated core rests upon a rubber cushioning member 28 to serve as a stop for the plunger, the cushioning member being carried by a plate 29 that is rigidly secured to the supporting plates 24. The armature or plunger 30 comprises laminations riveted to ribs 30′ that are welded to the switch rod 31 and project above the laminations to carry a part of the control mechanism. The conical contact 32 on the switch rod 31 is axially alined with a conically recessed contact assembly comprising a plurality of wedge-shaped segments 33 on leaf springs 34. The lower ends of the springs 34 are secured to a cylinder 35 on a plate 36 that is supported from the plate 29 by a plurality of insulating rods 37. A pressure contact member 38 is connected to plate 36 by jumpers 39 and pressed into engagement with the lower closure 14 by a spring 40. A terminal lug 41 projects below the closure 14 for connection to similar lugs of the shorting contactors of other phases or to the conductor of a two-wire branch other than that to which source and load terminals 16, 18 are connected.

The hollow insulator is filled with oil to a level above the core 23, and a low resistance connection from the load terminal 18 to the moving contact 32 is obtained through jumpers 32′ that extend from contact 32 to the plate 29.

The upper end of the rod 31 extends through a strap 42 that is fixed to the supporting plates 24, and a spring 43 is coiled about the rod 31 to hold the rod in elevated position against the closing force developed by coil 19 at current flow less than a predetermined amount, for example 50%, above rated current that the contactor can carry for long periods.

The source or line terminal 16 is connected to the stationary contact 44 of a coil-shorting switch by the strap 20 and a jumper 45. The movable switch contact 44′ is carried by an arm 46 pivoted upon the supporting plates 24 and normally retained in open-circuit position by a spring 47 that is anchored to plate 24 by a bolt adjustable along slot 47′. The arm 46 is grounded on the load terminal 18 through the supporting plates and preferably is connected to the plate 24 or to lead 21 by a jumper 48, see Fig. 4*a*. A closure of switch contacts 44, 44′ will short circuit the operating coil 19 and thus prevent operation of the shorting contactor. Time-delay mechanism, indicated generally by the block 49, is provided for retaining the switch 44, 44′ in closed position for a predetermined interval following a closure of the switch.

Figure 6:
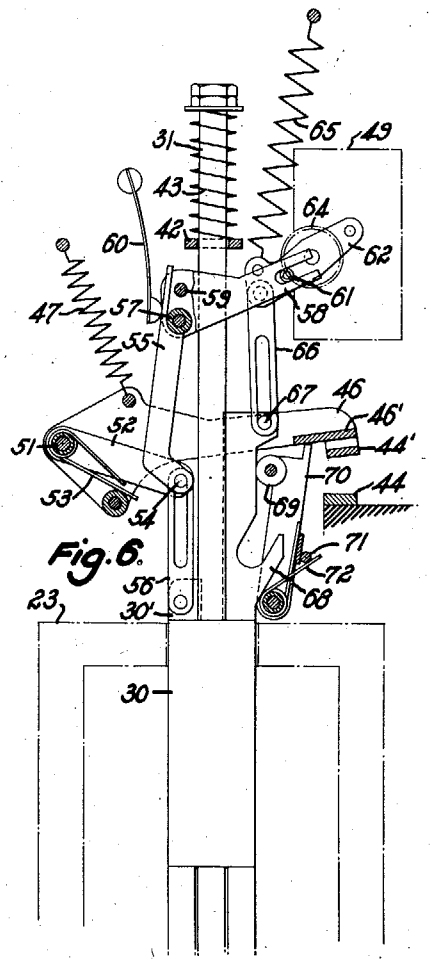
Figure 5:
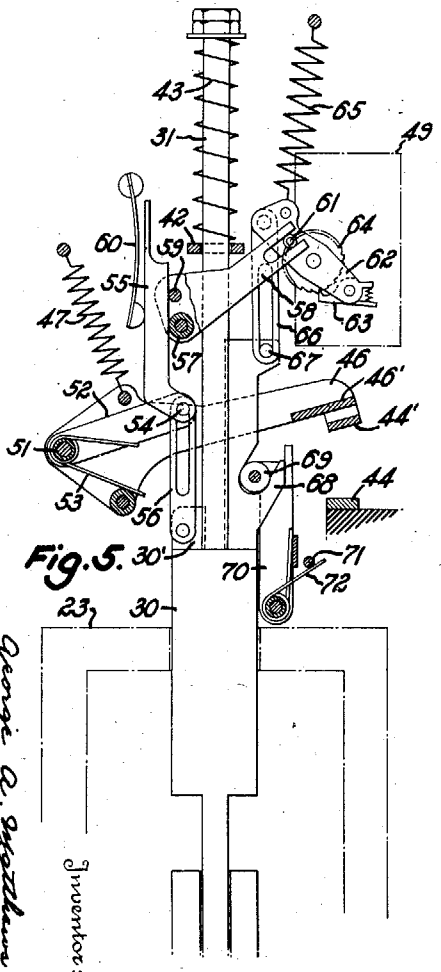

The control mechanism for the shorting contactor is located between the upper ends of the supporting plates 24 and comprises a mechanical linkage having parts mounted on the plates 24 and other parts pivoted to the central ribs 30' of the laminated core. The control mechanism is illustrated in Figs. 5–7 as viewed from a plane through the axis of the rod 31, except that the timing mechanism is shown in elevation at the right of Fig. 5 and in Figs. 6 and 7.

The movable contact arm 46 comprises a pair of duplicate members mounted on plates 24 by a pivot pin 51 and joined at their outer ends by a strap 46' which carries the contact 44'. A link 52, also pivoted on pin 51, is coupled to the contact arm 46 through a hairpin spring 53 that urges the contact arm 46 clockwise when link 52 is rotated clockwise by a plunger. A pivot pin 54 connects the other end of link 52 to a latch member 55 and extends through an elongated slot in a link 56 that is pivoted to the core plate 30'. The upper end of the latch member is cut back for locking engagement with a roller 57 on the pivot pin of a lever 58, the latch member being pressed toward the roller 57 and a latch-releasing pin 59 on lever 58 by a spring 60. The forked outer end of lever 58 receives a pin 61 on a timing lever 62 carrying a pawl 63 that bears on ratchet wheel 64 on the shaft of an escapement mechanism of conventional type, indicated by the block 49. Pawl 63 drives the ratchet wheel clockwise when lever 62 is rocked in that direction by a spring 65, and rides idly over the ratchet wheel when the lever is moved counterclockwise by a link 66 having an elongated slot receiving a pin 67 on the core plate 30'. The core plate 30' has an inclined slot, defined by a notch in the plate and a projection 68, for receiving a roller 69 on a "hold-off" link 70 that is pivoted to the supporting plates 24 and urged clockwise towards a stop pin 71 by a spring 72.

The control mechanism operates in the following manner. The arm 46 is normally held in raised position by the spring 47, and the roller 69 of link 70 is seated in the inclined slot of the core plate 30', as shown in Fig. 5. A predetermined current flow through coil 19 overcomes the spring 43 and moves the core 30 and rod 31 downwardly to close the shorting contactor, and the several parts then have the positions shown in Fig. 6. Link 56 moves the latch member 55 down into locking engagement with the roller 57, and rocks the link 52 clockwise to stress the spring 53 that urges the contact arm 46 towards closed position. The drop of the plunger released the roller 69 of link 70 from the slot in the core plate 30', and thereby forced link 70, in conjunction with the spring 72, clockwise to the stop 71. This brought the upper end of link 70 into the path of the bar 46' of the contact arm 46 and thus prevented a closure of the coil-shunting contacts 44, 44'. Link 66 moved the timing lever 62 counterclockwise and thereby stressed the spring 65 that is to restore the timing lever to normal position with a time-delay that is controlled by the escapement mechanism 49. The latch-release pin 59 is now spaced from the latch member 55.

Figure 7:
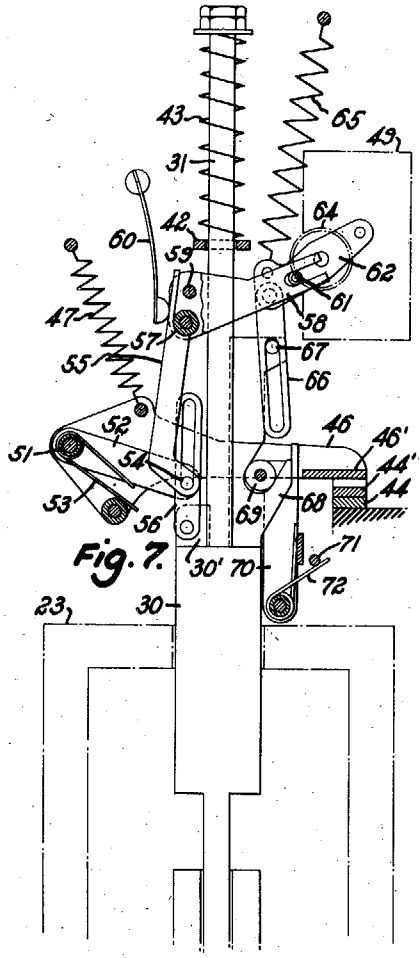
Figs. 5, 6 and 7 are sectional views of the coil-shunting switch and time-controlled latching mechanism of the line shorting contactor.

Upon the first opening of the circuit breakers CB, the rod 31 is lifted by the spring 43 and the parts assume the positions shown in Fig. 7. Link 52 cannot move up as it is locked by the engagement of latch member 55 with the roller 57, and the stress in the spring 53 tends to move the contact arm 46 clockwise to close contacts 44, 44'. This closing motion takes place as soon as the core assembly moves upwardly to force the roller 69 of link 70 into the inclined slot by the projection 68. The elongated slot in links 66 permits the core assembly to lift, but the counterclockwise movement of the timing lever 58 is retarded by the escapement mechanism 49 since the timing lever is locked to the escapement mechanism by the pawl 63 and ratchet wheel 64. The time-delayed return movement of the lever 58 displaces the pin 59 into engagement with the latch member 55 to force it out of locking engagement with the roller 57. When released from roller 57, the latch member 55 is moved upwardly by the spring 53 thus releasing the stress in that spring and thereby permitting the spring 47 to rock the arm 46 counterclockwise to open contacts 44, 44'. The equipment is thus reset to the condition shown in Fig. 5 after a time-delay determined by the escapement mechanism 49. The time-delay is sufficient, as stated above, to permit the reclosing circuit breaker CB to operate through a predetermined time-delay to a lockout in the case of a permanent fault on the line.

It is to be noted that, upon the initial removal of current by the circuit breaker, the shorting contactor is locked out electrically by the switch 44, 44' that shunts the coil 19, and mechanically by roller 69 and its supporting link 70 that is blocked against clockwise movement by the strap 46' of the closed contact arm 46.

The tripping current of the shorting contactor is determined by the number of turns of the coil 19, and the forces exerted by springs 43, 47, 53 and 65. The lockout period is determined, for any given escapement mechanism, by the force developed by the spring 65 and by the gear train in the escapement mechanism. A control of the operating characteristics is readily attained by adjusting the compression of spring 43 by the downward or upward movement of the locknuts on the end of the rod 31. The spring 43 opens the shorting contactor in about 5 cycles after the circuit breakers open, but the exact opening time is not important since the first reclosure of the circuit breaker is delayed for from 30 to 60 cycles as a protection against multiple lightning strokes. The shorting contactor must open under no-load, however, as the simple design which facilitates an instantaneous closure makes no provision for extinguishing an arc between the main contacts.

The operating speeds indicated by curves A, A' of Fig. 1 have been obtained in mechanically stable equipment such as shown in Fig. 4, and trial installations have fully demonstrated that insulated conductors can be protected from burn off from transient faults when the line voltage is removed from the fault in ½ cycle. The line shorting contactors do not, and are not intended to, protect the conductors against burn off in the case of a permanent or relatively permanent fault. The maximum service is maintained and the location of a permanent fault is most readily ascertained, when the faulty branch circuit is isolated by sectionalizing fuses or is burned off during the sequence of operations of a reclosing circuit breaker prior to a final lockout.

The shorting contactors may be used with any station breakers of the reclosing type but the maximum protection is obtained when the circuit breakers CB are of the type shown diagrammatically in Figs. 3 and 3a, and in central section in Fig. 8. These circuit breakers open instantaneously, in from 2 to 3 cycles, and thus protect the conductors against burn off by transient faults between the substation and the shorting contactors which, as stated above, are preferably located some distance from the station to reduce the shock to station equipment by the dead short circuit produced by the shorting contactors. Furthermore, the new circuit breakers afford substantial protection against burn off during the lockout time of the shorting contactors after a closure arising from a transient fault. The shorting contactors may be out of action for about 3 minutes in such cases since service is restored at the first reclosure of the circuit breaker. Lightning strokes during this interval will usually result in a burn off when the circuit breakers are of prior types and open in from 10 to 40 cycles, but this damage is prevented when the new circuit breakers are used with the line shorting contactors.

The circuit breakers are light weight, fully automatic, single-pole oil circuit breakers that each includes its own mechanical timing equipment and requires no auxiliary circuits or devices for full automatic operation. As shown in Fig. 3a, the circuit breaker includes a tripping coil 80 and operating coil 81 in series between terminals 82, 83, the operating coil 81 being normally shunted by the switch 84 that is opened by the tripping coil 80 against a spring 84'. This switch and the main breaker switch are of the reciprocating rod type, as described and claimed in my prior Patent No. 2,167,665, granted August 1, 1939, "Circuit breaker," in which an annular arc-extinguishing chamber is formed by horn fiber or other organic material which gives off de-ionizing gases when vaporized by the arc.

The core or plunger 85 of coil 81 is secured to a metal rod 86 which carries the movable contact 87 of the circuit breaker and terminates in a rod 88 of horn fiber or the like. The stationary breaker contacts include a main contact 89 that is normally engaged by the rod 86 or its movable contact 87, and an arcing contact 90 above and spaced from the main contacts. The arcing contact 90 is connected to the main contact 89 through a spiral coil 91 coaxial with the rod 86 and the contacts. The function of coil 91 is to rotate the arc that is drawn between the moving contact 87 and the arcing contact 90 when the breaker opens, and the coil is wound in the sense opposite that of the operating coil 81. The shunt or tripping switch 84 is of simpler design as the arc drawn across its contacts can be extinguished without the aid of an arc-spinning coil.

Timing mechanism 92 is provided to delay the second and subsequent openings of the breaker, but the first opening takes place with no delay. The timing mechanism is indicated generally by the block diagram overlying the junction of the operating lever 93 of switch 84 and the link 94 that connects lever 93 to the armature 95 of the trip coil 80. Any desired type of mechanism may be employed to delay the opening of the shunt switch 84 for intervals of 60 cycles or upward when the fault is still on the line at the first or subsequent closures of the breaker. The detailed construction is not illustrated since it forms no part of the present invention.

The breaker is housed within a chamber comprising a hollow insulator 96 and end closures 97, 98 of metal that carry terminals 82, 83, respectively. The insulator is provided with metal sleeves 99 to which the closures are bolted, and is recessed to receive a mounting bracket 100. A plate 101 extends across the upper end of the insulator 96 and constitutes the support for the trip mechanism and the breaker assembly, and the control mechanism is located in the domed closure 97 above the plate 101. The insulator 96 is preferably filled with oil to approximately the lower face of the plate 101 that supports all of the switch and control mechanism.

The framework of the breaker assembly includes a series of rods 102, a metal plate 103 on which the coil 81 rests, and a plurality of horn fiber plates or disks 104. Insulating rods 105 are threaded upon rods 102 to secure the plate 103 against spacing sleeves 105' on rods 102, and rods 102' are threaded upon the rods 105 to carry the disks 104. A dashpot for arresting the opening movement of the breaker is formed by the enlarged lower end 85' of the core 85 and a cylinder 106 that is mounted between the plate 103 and the upper disk 104. The top portion of the cylinder flares inwardly above vent openings that permit a free escape of oil from within the cylinder during the major part of the opening movement of the rod 86.

The two intermediate plates 104 are separated slightly and are recessed to receive small horn fiber disks 104' that form the outer wall of the arc-suppressing chamber. The small plates may be replaced when the diameter of the chamber has been appreciably increased by the vaporization of the horn fiber. The arc-spinning coil 91 is mounted between the two lower disks 104, and connected between arcing contact 90 that is recessed into the lower face of the upper disk of this pair and a flanged brass tube 108 that is bolted to the bottom disk 104 to support the main contact assembly. The main contact 89 includes a plurality of arcuate segments secured to the upper ends of the several sections of a longitudinally slotted tube 109 of resilient metal. The flanged lower end 110 of the tube 109 is electrically connected to a disk 111 by a jumper 112, and the disk 111 is pressed against a boss on the lower closure 98 by springs 113 coiled about guide rods that extend through the flange 110.

The breaker opens against a spring 114, and displaces a rachet bar 115 into engagement with the wheel 116 of an escapement mechanism. The spring 114 tends to reclose the breaker as soon as the circuit opens but the downward motion of the switch rod 86 is delayed by the escapement mechanism. The escapement may be of known types, including means for locking the breaker in open position after a predetermined number of reclosures if the fault is still on the line and means for resetting from any point in the schedule of reclosures when the breaker closes on a sound line. The time-delay may be of the customary order of from 30 to 60 cycles, but the specific design of the escapement mechanism is not an essential feature of this invention.

It is to be noted that the line current flows through the series operating coil 81 only when the shunting switch 84 is opened by the coil 80. The tripping current is determined by the coil 80 and the reclosing spring 84' of the shunting switch 84. The tripping value may be adjusted as desired but will usually be set up to 200% or more of the rated current capacity of the breaker. Heat developed in the coil 80 by continued overloads short of the tripping value does not cause serious heating and coil destruction, as has been the case with some prior breakers with series operating coils, since the coil 80 opens only the shunting switch 84 and not the breaker contacts.

It is therefore possible to design the operating coil 81 to develop sufficient force for an exceedingly high speed opening of the breaker since only a momentary current surge flows in the operating coil. The reciprocating rod and de-ionizing chamber construction also contribute to high speed operations as a 1 to 2 inch movement of the rod, which is sufficient to separate the contacts and suppress the arc, is obtained in about 2 to 3 cycles with operating coils 81 of practical design. The initial opening of the breaker is effected in from 2 to 3 cycles in accordance with the magnitude of the fault current, as shown graphically by curve B, Fig. 1, but the subsequent openings are delayed by the timing mechanism 92 to supply current to a persistent fault for periods of 30 cycles and upward, thereby to blow sectionalizing fuses if the fault cannot be burned off. This results in the isolation of the faulty branch but service is maintained on the remainder of the feeder system.

The method of operation of the protective equipment is as follows. The circuit breakers are adjusted to trip at a selected overload value, which may be, as in present practice, about 200% of the rated current capacity of the breaker, and the line shorting contactors are set to trip at a lesser overload. Any fault that results in the predetermined overload at the line shorting contactors thus trips the contactors to place a metallic short circuit across the affected conductors in ½ cycle after the fault initiation.

This instantaneous suppression of the fault current prevents the blowing of fuses and the burn off of insulated conductors at the fault. In the case of bare wires, the instantaneous suppression of the fault current eliminates damage to the supporting structure when a traveling arc starts close to and would reach the supporting structure before it is blown out. The circuit breakers are tripped either by the initial fault current or by the heavy current flow through the closed contactors SC, and reclose after a delay or from 30 to 60 cycles which permits de-ionization of the gases in the region of the arc path. The shorting contactors open with the interruption of current flow by the circuit breakers, and are locked out for a predetermined time during which the circuit breakers go through a series of time-delay trip operations to lockout in the case of permanent faults.

The sequence of operations varies with the nature of the fault *f* on a feeder circuit B. If the fault was due to a transient cause, such as lightning or a small wire dropped across the line, the circuit breakers stay in on the first reclosure. If the fault is still on the line, the heavy current flow tends to burn off the fault *f* and to blow the fuses F. The feeder circuit itself may burn off before or simultaneously with the burning of the foreign object that is across the line. If the line is not cleared by one of these methods, the fuses blow to remove the faulty section from the feeder system before the circuit breakers complete a full sequence of reclosures to a lockout, and service is thereby restored to the remainder of the feeder circuit. The instantaneous closure of the shorting contactors protects the fuses against damage before the first opening of the circuit breakers, and thereby affords greater latitude in the selection of the time-response characteristics of sectionalizing fuses. The fuses will usually blow during the first reclosure of the circuit breakers in the case of a permanent fault.

Protection against burn off is obtained whether the circuit breakers are of the described construction or of prior designs that require at least 8 cycles to open. The Fig. 8 circuit breakers afford greater protection against an outage of a part or all of the feeder since they open in about 2 cycles. The existing substation equipment may be such that the line shorting contactors should be located a mile or more from the station to reduce the shock placed on the station equipment by the metallic short circuit. The impedance gradient of the line to the short circuit point reduces the current drawn by a short circuited line, and the maximum short circuit current at a given substation can therefore be controlled to some extent by locating the shorting contactors some distance from the station. The preferred spacing will depend upon such factors as the capacity of the station equipment and of the line feeding it, the standards of operation established by the public utility company, and the type of service fed by the protected circuits. The shorting contactors can be located at the substation in some cases but at other stations the preferred location may be from one mile up to two or three miles from the station. This means that a portion of the feeder is not protected by the shorting contactors, but the wires are usually of large size near the station and will not be seriously damaged by arc burns when the circuit breakers open in 2 cycles. Electrical storms are the principal cause of transient faults during certain seasons, and lightning may strike the same feeder several times at short intervals. The shorting contactors trip and then lockout at the first lightning stroke, but the breakers will reset for a new cycle when the first reclosure is on a clear line. Another lightning stroke during the lockout period of the shorting contactors will usually result in a burn off when the breakers are of the prior designs but the high opening speed of the new breakers will usually protect even the smaller insulated wires against a burn off.

The new circuit breakers may be used without the shorting contactors but the full advantages of the invention are attained when a feeder circuit is protected jointly by the new circuit breakers and the line shorting contactors.

It is to be understood that adequate protection against burn off from transient faults may be had on some feeders when the fault current continues for more than from ½ to 2 cycles, but equipment with this high operating speed is readily manufactured and there is no advantage to be gained by designing the equipment for a longer operating time.

Time values are stated in cycles on a 60 cycles per second basis since it is the usual practice in this art to measure the operating times of protective switchgear with oscillographs that generate a "timing wave" of the frequency of the electrical distribution system. The novel equipment of this invention was tested and has been used on lines supplied with alternating current of a frequency of 60 cycles per second but the protective methods and apparatus may be used on direct current lines or alternating current lines energized at 25 cycles per second or at other frequencies.

Claims specific to the line shorting contactor and to the reclosing circuit breaker herein illustrated and described have been presented in divisional applications Serial No. 438,823, filed April 13, 1942, on which Patent No. 2,334,571 issued November 16, 1943, and Serial No. 439,576, filed April 18, 1942, respectively.

The circuit arrangement or combination of protective devices herein shown and described is illustrative of the invention, and various changes that may occur to those familiar with the art fall within the spirit of my invention as set forth in the following claims.

I claim:

1. In an electrical distribution system, the combination with a current source, conductors extending from said current source to form a distribution circuit, reclosing circuit-interrupting means responsive to a fault on said circuit to effect the first opening thereof after a time delay during which arcing conduction resulting from a fault will damage the conductors, said circuit-interrupting means including control mechanism for opening and reclosing the circuit a plurality of times to a final lockout in the event of a permanent fault, of means to protect said conductors against damage from transient faults; said protecting means comprising a normally open switch across said conductors, spring means biasing said switch to open position, means responsive to a fault current to close said switch prior to the first opening of said distribution circuit by said circuit-interrupting means, thereby to establish a metallic short-circuit across said conductors and remove the voltage from the fault point, said spring means opening said switch to remove said metallic short-circuit upon opening of said distribution circuit by said circuit-interrupting means, said control mechanism including means to delay the first reclosure of said circuit-interrupting means until said switch is opened to remove said metallic short-circuit, and timing means to lock said switch against reclosure during the time period required for operation of said reclosing circuit-interrupting means to a final open position in the event of a permanent fault.

2. In an electrical distribution system, the combination with reclosing protective apparatus for opening the system after a time delay of from 1/30 second to about 1 second after fault initiation and to reclose the system a plurality of times to a lockout in the event of a permanent fault; of shorting means responsive to a fault on the system to short-circuit the same prior to the initial opening of said protective apparatus; said shorting means comprising a normally open switch, an operating winding traversed by the system current for actuating the switch to closed position in the event of a current in excess of a predetermined value, spring means normally retaining said switch in open position and operative to open the same to remove the short-circuit upon the initial operation of said protective apparatus, and time-delay means energized upon the opening of said switch by said spring means to prevent a reclosure of said switch within the time interval required for operation of said reclosing protective apparatus to a lockout in the event of a permanent fault.

3. In an electrical distribution system, a current source, conductors extending from said source, and branch circuits connected across said conductors through circuit interrupters including thermally responsive means for opening the same after a time delay interval in the event of faults on the respective feeder circuits, of protective means to preclude opening of said interrupters from transient faults; said protective means comprising a normally open shorting circuit connected across said conductors between said branch circuits and said current source, a line shorting contactor for closing said shorting circuit, and means responsive to fault current flow to actuate said shorting contactor to closed position within a time interval substantially shorter than the time delay interval within which said circuit interrupters may open, thereby to collapse the voltage at the fault point to zero, and means for opening said shorting circuit after a predetermined time interval.

4. In an overhead power distribution system, a source of current, a pair of overhead conductors forming a circuit fed from said current source, means including a normally open switch operative to closed position by a fault current to short-circuit said conductors, circuit interrupting means responsive to the fault current and the short-circuit current to open said circuit, means responsive to the opening of said circuit by said circuit-interrupting means to render said short-circuiting means inoperative for a predetermined period after the initial operation thereof, and control means operative within said predetermined period to reclose said circuit-interrupting means a plurality of times prior to a final opening thereof in the case of a permanent fault.

5. In an electrical distribution system, the combination with a current source, conductors forming a distribution circuit fed from said source, and circuit-interrupting means responsive to overload current flow and including mechanism for opening and reclosing said circuit a plurality of times prior to a final opening thereof in the event of a permanent fault, of a shorting circuit across said conductors including a normally open shorting switch having contacts permanently connected to the respective conductors, means responsive to fault current flow to close said shorting switch prior to the initial opening of the distribution circuit by said circuit-interrupting means, means to open said shorting switch in the interval between the initial opening and the first reclosure of the distribution circuit by said circuit-interrupting means, and timing means to lock said shorting switch in open position for a period longer than the operating time of said circuit-interrupting means to a final circuit open condition in the event of a permanent fault.

6. In an electrical distribution system, the combination with a current source, a pair of conductors forming a distribution circuit fed from said current source, and circuit-interrupting means responsive to overload current flow to open said circuit and to reclose the same a plurality of times for intervals of the order of at least ½ second, of means to protect said conductors from damage in the case of transient faults; said protecting means comprising means to short-circuit said conductors prior to the initial opening of the circuit by said circuit-interrupting means, means operative upon the initial opening of the distribution circuit to remove the short-circuit, and means to lock said short-circuiting means against operation for a predetermined period after the removal of the short-circuit, said predetermined period extending over a plurality of opening and reclosing operations of said circuit-interrupting means.

7. In an electrical distribution system, the combination with an alternating current source, a feeder circuit connected to said current source, and circuit-interrupting means of the reclosing type on said feeder circuit, said means including mechanism responsive to excessive current flow to open and to reclose said circuit-interrupting means a plurality of times, a line shorting contactor for short circuiting the feeder circuit; said line shorting contactor including means responsive to excessive current flow to operate said contactor to short circuit the feeder circuit prior to the initial opening of said circuit-interrupting means and within 1/30 second after a fault inception, means to operate said contactor to remove the short-circuit upon the initial opening of said circuit-interrupting means, and timing means to lock said contactor in open circuit condition for a predetermined period following an operation thereof to open circuit condition.

8. In an electrical distribution system, the invention as claimed in claim 7, wherein said circuit-interrupting means comprises a reclosing circuit breaker between said current source and said feeder circuit.

9. In an electrical distribution system, the invention as claimed in claim 7, wherein said circuit-interrupting means comprises repeater fuses on said feeder circuit.

10. In an electrical distribution system, the combination with an alternating current source, an overhead feeder circuit including insulated conductors, a circuit breaker between said current source and said feeder circuit, and means responsive to excess current flow to open and to reclose said circuit breaker a plurality of times, of a normally open switch connected across said feeder circuit, means responsive to excess current arising from a fault to close said switch within one cycle after fault inception, means to open said switch upon the initial opening of the feeder circuit by said circuit breaker, and means for retaining said switch in open position for a period corresponding to a plurality of reclosures of said circuit breaker after the initial operation thereof.

11. The invention as claimed in claim 10, wherein said means for closing said switch includes a coil in series with the feeder circuit; and said means for retaining said switch in open position includes a normally open switch for short circuiting said coil, and means operable upon movement of said first switch to open position to close said second switch.

12. In an electrical distribution system, the combination with an alternating current source, a feeder circuit, a circuit breaker including means to open the same in response to a fault on the feeder circuit, and time-delay means for reclosing the circuit breaker, of a normally open line shorting contactor connected across the feeder circuit, means including a coil in series with said feeder circuit to close said contactor instantaneously upon fault inception, means to open said contactor upon the initial opening of said circuit breaker, locking means to retain said contactor open after a cycle of closing and opening thereof due to a fault on the feeder circuit, and time-delay means for rendering said locking means inoperative.

13. The invention as claimed in claim 12, wherein said locking means includes a switch for shunting said coil.

14. The invention as claimed in claim 12, wherein said locking means includes a mechanical latch for locking said contactor in open position.

15. The invention as claimed in claim 12, wherein said locking means includes a switch for shunting said coil and a mechanical latch for locking said contactor in open position.

GEO. A. MATTHEWS.

REFERENCES CITED

The following references are of record in the file of this patent:

UNITED STATES PATENTS

| Number | Name | Date |
|---|---|---|
| 1,201,610 | Nicholson | Oct. 17, 1916 |
| 2,075,132 | Parsons | Mar. 30, 1937 |